US009052015B2

(12) United States Patent
Ashiba

(10) Patent No.: US 9,052,015 B2
(45) Date of Patent: Jun. 9, 2015

(54) CYLINDER APPARATUS

(71) Applicant: HITACHI AUTOMOTIVE SYSTEMS, LTD., Ibaraki (JP)

(72) Inventor: Masahiro Ashiba, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 37 days.

(21) Appl. No.: 13/751,645

(22) Filed: Jan. 28, 2013

(65) Prior Publication Data

US 2013/0192457 A1  Aug. 1, 2013

(30) Foreign Application Priority Data

Jan. 31, 2012 (JP) .................................. 2012-019174

(51) Int. Cl.
 *F16F 9/34* (2006.01)
 *F16J 10/02* (2006.01)
 *F16F 9/348* (2006.01)

(52) U.S. Cl.
 CPC ............... *F16J 10/02* (2013.01); *F16F 9/3484* (2013.01)

(58) Field of Classification Search
 CPC ........... F16F 9/34; F16F 9/348; F16F 9/3405; F16F 9/3484; F16F 9/3485
 USPC .................... 188/315, 322.13, 322.14, 322.15
 See application file for complete search history.

(56) References Cited

U.S. PATENT DOCUMENTS

| 2,726,737 | A | * | 12/1955 | Chisholm, Jr. ............ 188/322.14 |
| 3,199,636 | A | * | 8/1965 | Bourcier ........................ 188/317 |
| 3,321,051 | A | * | 5/1967 | Heckethorn ................... 188/315 |
| 3,791,407 | A | * | 2/1974 | Nicholls ................... 137/512.15 |
| 3,845,782 | A | * | 11/1974 | Nicholls et al. ................. 137/493 |
| 4,809,829 | A | * | 3/1989 | Hummel et al. .......... 188/322.15 |
| 4,993,524 | A | * | 2/1991 | Grundei et al. ............. 188/282.6 |
| 7,048,099 | B2 | * | 5/2006 | Umezawa ................. 188/322.14 |
| 2005/0092565 | A1 | * | 5/2005 | Asadi et al. .............. 188/322.15 |

FOREIGN PATENT DOCUMENTS

| DE | 10207506 A1 | * | 9/2003 | ................ F16F 9/34 |
| FR | 2236130 A1 | * | 1/1975 | ............ F16F 9/3405 |
| JP | 64-40731 | | 2/1989 | |

* cited by examiner

*Primary Examiner* — Bradley King
*Assistant Examiner* — Stephen Bowes
(74) *Attorney, Agent, or Firm* — Wenderoth, Lind & Ponack, L.L.P.

(57) ABSTRACT

Provided is a cylinder apparatus capable of obtaining optimum valve characteristics. The cylinder apparatus has an annular valve member provided with at least a part of flow paths and having a through-bore, a pin member inserted through the through-bore of the valve member, and an annular disk valve having the pin member inserted therethrough and movable at both inner and outer peripheries thereof selectively away from and into contact with one end surface of the valve member to open and close the flow paths, respectively. The valve member has a projecting portion around the through-bore on the one end surface. The projecting portion is locally provided with circumferentially spaced grooves. The disk valve has small-diameter portions extending toward the grooves from the inner periphery thereof. The small-diameter portions are slidable relative to the pin member.

15 Claims, 4 Drawing Sheets

CYLINDER APPARATUS

BACKGROUND OF THE INVENTION

The present invention relates to cylinder apparatus.

There is a cylinder apparatus in which a disk valve slides relative to a valve member having flow paths formed therein to selectively open and close the flow paths, as disclosed in Japanese Patent Application Publication No. Sho 64-40731.

SUMMARY OF THE INVENTION

Cylinder apparatus have been demanded to be capable of obtaining optimum valve characteristics.

Accordingly, an object of the present invention is to provide a cylinder apparatus capable of obtaining optimum valve characteristics.

To attain the above-described object, the present invention provides a cylinder apparatus having an annular valve member provided with at least a part of flow paths and having a through-bore, a pin member inserted through the through-bore of the valve member, an annular disk valve having the pin member inserted therethrough and movable at both inner and outer peripheries thereof selectively away from and into contact with one end surface of the valve member to open and close the flow paths, respectively, and an enlarged-diameter part provided on a portion of the pin member in a direction in which the disk valve is movable away from the one end surface of the valve member to prevent fall-off of the disk valve. The valve member has a projecting portion around the through-bore on the one end surface thereof. The projecting portion is locally provided with circumferentially spaced grooves. The disk valve has small-diameter portions extending toward the grooves from the inner periphery thereof. The small-diameter portions are slidable relative to the pin member.

DETAILED DESCRIPTION OF THE PREFERRED EMBODIMENTS

First Embodiment:

A shock absorber as a first embodiment of a cylinder apparatus according to the present invention will be explained below with reference to FIGS. 1 to 4.

Figure 1:
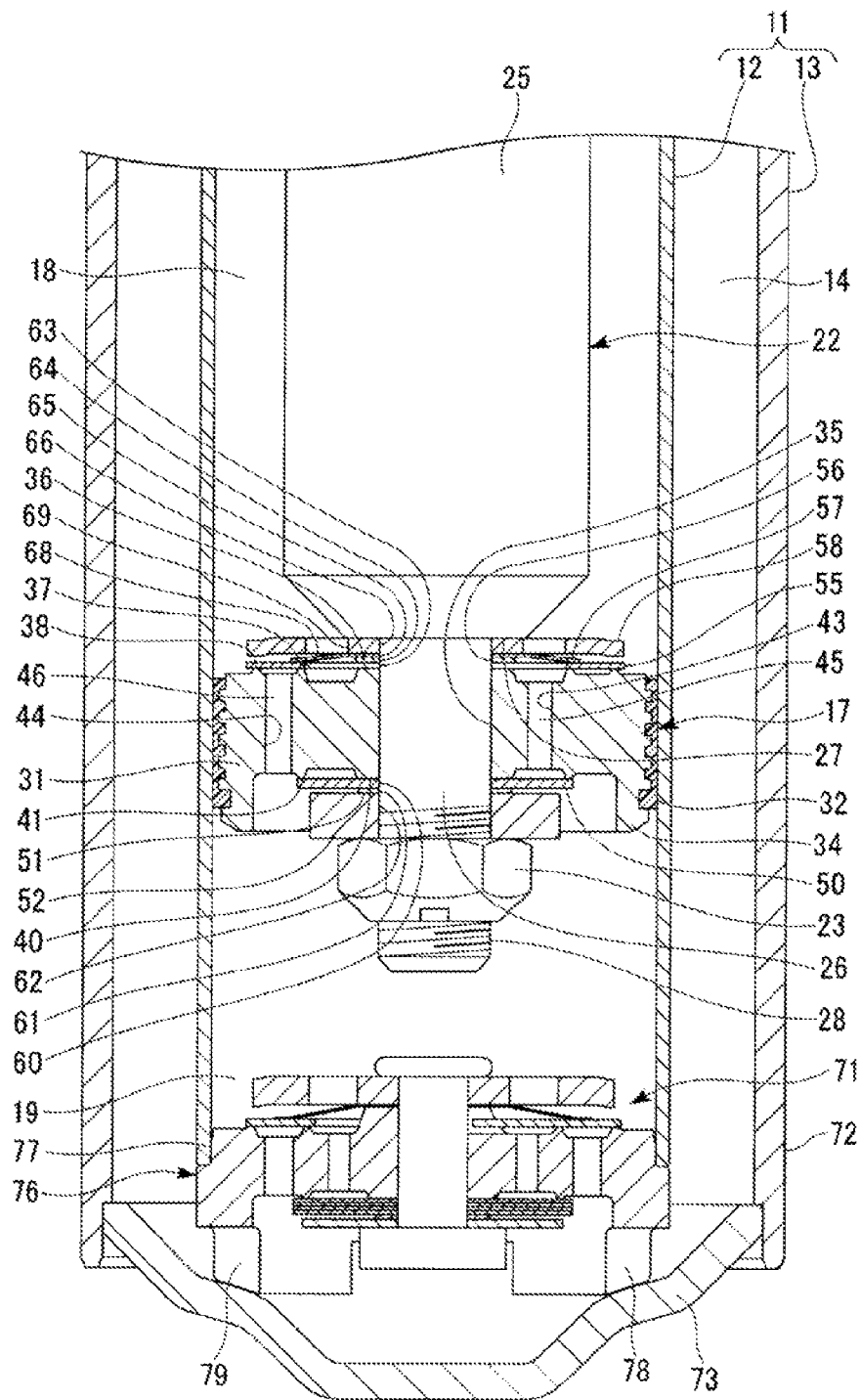
FIG. 1 is a fragmentary sectional view of a shock absorber as a first embodiment of a cylinder apparatus according to the present invention.

As shown in FIG. 1, a shock absorber according to the first embodiment of the present invention has a cylinder 11 in which a fluid, e.g. a liquid or a gas, is sealed. The cylinder 11 has an inner tube 12 and an outer tube 13 larger in diameter than the inner tube 12 and concentrically provided to cover the inner tube 12. Thus, the cylinder 11 has a double-tube structure in which a reservoir chamber 14 is formed between the inner tube 12 and the outer tube 13.

The inner tube 12 of the cylinder 11 has a piston 17 slidably fitted therein. The piston 17 defines an upper chamber 18 and a lower chamber 19 in the inner tube 12, i.e. in the cylinder 11. The cylinder 11 has a hydraulic liquid and a gas sealed therein as fluids. Specifically, the upper chamber 18 and the lower chamber 19 have a hydraulic liquid sealed therein, and the reservoir chamber 14 has the hydraulic liquid and a gas sealed therein.

The cylinder 11 has a rod 22 inserted therein. One end of the rod 22 extends to the outside of the cylinder 11. The other end of the rod 22 extends into the inner tube 12. The piston 17 is fastened to the other end of the rod 22 in the inner tube 12 by using a nut 23. The one end of the rod 22 extends to the outside of the cylinder 11 through a rod guide (not shown) and an oil seal (not shown) that are provided in the upper end of the cylinder 11, which comprises the inner tube 12 and the outer tube 13.

The rod 22 has a main shaft portion 25 and a mounting shaft portion 26 located at an end thereof inside the cylinder 11 and smaller in diameter than the main shaft portion 25. The main shaft portion 25 has a step 27 at an end thereof closer to the mounting shaft portion 26. The step 27 extends in a direction perpendicular to the axis of the main shaft portion 25. The mounting shaft portion 26 has an external thread 28 formed over a predetermined range of an end thereof remote from the main shaft portion 25. The external thread 28 is to be engaged with the nut 23.

The piston 17 has a substantially disk-shaped piston valve member 31 fitted in the inner tube 12 of the cylinder 11 to divide the interior of the inner tube 12 into two chambers, i.e. an upper chamber 18 and a lower chamber 19. The piston 17 further has a sliding contact member 32 fitted to the outer peripheral surface of the piston valve member 31 so as to be in sliding contact with the inner peripheral surface of the inner tube 12. The piston valve member 31 has an axially projecting cylindrical portion 34 formed on the outer periphery of an end thereof closer to the lower chamber 19.

The piston valve member 31 has a through-bore 35 axially extending through the diametrical center thereof. The rod 22 is inserted through the through-bore 35. The piston valve member 31 has an axially projecting annular projecting portion 36 formed on an end thereof axially opposite to the end thereof where the cylindrical portion 34 is provided. The projecting portion 36 is located radially outside the through-bore 35. The piston valve member 31 further has an axially projecting annular inner seat portion 37 located radially outside the projecting portion 36 and an axially projecting annular outer seat portion 38 located radially outside the inner seat portion 37. Further, the piston valve member 31 has an axially projecting annular boss portion 40 formed on the axial end thereof provided with the cylindrical portion 34. The boss portion 40 is located radially outside the through-bore 35. The piston valve member 31 further has an axially projecting annular seat portion 41 located radially outer than the boss portion 40 and radially inner than the cylindrical portion 34.

The projecting portion 36, the inner seat portion 37 and the outer seat portion 38 coincide in height with each other in the axial direction of the piston valve member 31. The seat portion 41 is somewhat higher in projecting height than the boss portion 40.

The piston valve member 31 has a plurality of circumferentially spaced flow path holes 43 (only one of them is shown in FIG. 1 because it is a sectional view). Each flow path hole 43 axially extends through the piston valve member 31. The flow path hole 43 opens at one axial end thereof between the projecting portion 36 and the inner seat portion 37 and at the other axial end thereof between the boss portion and the seat portion 41. Further, the piston valve member 31 has a plurality of circumferentially spaced flow path holes 44 (only one of them is shown in FIG. 1 because it is a sectional view). Each flow path hole 44 axially extends through the piston valve member 31. The flow path hole 44 opens at one axial end thereof between the inner seat portion 37 and the outer seat portion 38 and at the other axial end thereof between the seat portion 41 and the cylindrical portion 34.

Each inner flow path hole 43 forms one flow path 45 that allows the hydraulic liquid to flow between the upper chamber 18 and the lower chamber 19. Each outer flow path hole 44 forms the other flow path 46 that allows the hydraulic liquid to flow between the upper chamber 18 and the lower chamber 19. Thus, the flow paths 45 and 46 are provided in the piston valve member 31.

The piston 17 has a disk valve 50, a spacer 51, and a restricting member 52 at the axial end of the piston valve member 31 where the cylindrical portion 34 is provided. The disk valve 50, the spacer 51, and the restricting member 52 are stacked in the mentioned order from the piston valve member 31. Further, the piston 17 has a disk valve 55, a spacer 56, a spring member 57, and a restricting member 58 at the axial end of the piston valve member 31 opposite to the axial end where the cylindrical portion 34 is provided. The disk valve 55, the spacer 56, the spring member 57, and the restricting member 58 are stacked in the mentioned order from the piston valve member 31.

The disk valve 50 has a rod insertion bore 60 axially extending through the diametrical center thereof. The spacer 51 has a rod insertion bore 61 axially extending through the diametrical center thereof. The restricting member 52 has a rod insertion bore 62 axially extending through the diametrical center thereof. The disk valve 50, the spacer 51, and the restricting member 52 have the mounting shaft portion 26 of the rod 22 inserted through their respective rod insertion bores 60, 61 and 62. In this state, the disk valve 50, the spacer 51, and the restricting member 52 are clamped at their inner peripheral portions by the nut 23 and the piston valve member 31.

The disk valve 55 has a rod insertion bore 63 axially extending through the diametrical center thereof. The spacer 56 has a rod insertion bore 64 axially extending through the diametrical center thereof. The spring member 57 has a rod insertion bore 65 axially extending through the diametrical center thereof. The restricting member 58 has a rod insertion bore 66 axially extending through the diametrical center thereof. The disk valve 55, the spacer 56, the spring member 57, and the restricting member 58 have the mounting shaft portion 26 of the rod 22 inserted through their respective rod insertion bores 63, 64, 65 and 66. In this state, the disk valve 55, the spacer 56, the spring member 57, and the restricting member 58 are clamped at their inner peripheral portions by the piston valve member 31 and the step 27 of the main shaft portion 25 of the rod 22.

The disk valve 50, which is provided at the end of the piston valve member 31 closer to the lower chamber 19, has an outer diameter somewhat larger than that of the seat portion 41 and abuts against both the boss portion 40 and the seat portion 41 of the piston valve member 31 to close the inner flow paths 45. The disk valve 50 is unseated from the seat portion 41 to open the flow paths 45 by the pressure in the upper chamber 18 increased higher than the pressure in the lower chamber 19 by the piston 17 moving together with the rod 22 when the rod 22 moves toward an extension side where the amount of projection of the rod 22 from the cylinder 11 increases. Consequently, when the rod 22 moves toward the extension side, the fluid flows from the upper chamber 18 toward the lower chamber 19 through the inner flow paths 45 provided in the piston valve member 31. Accordingly, the disk valve 50 operates as an extension disk valve that selectively opens and closes the flow paths 45. Thus, the flow paths 45 allow the fluid to flow therethrough when the rod 22 and the piston 17 move toward the extension side.

The spacer 51 is smaller in outer diameter than the disk valve 50. The outer diameter of the spacer 51 is substantially equal to that of the boss portion 40. The restricting member 52 is larger in outer diameter than the spacer 51. The outer diameter of the restricting member 52 is somewhat smaller than that of the disk valve 50. When the disk valve 50 is deformed away from the seat portion 41 by a predetermined amount, the restricting member 52 abuts against the disk valve 50 to restrict further deformation of the disk valve 50.

The disk valve 55, which is provided at the end of the piston valve member 31 closer to the upper chamber 18, has an outer diameter somewhat larger than that of the outer seat portion 38 of the piston valve member 31. The disk valve 55 has a cut portion 68 located radially inner than a position at which the disk valve 55 abuts against the inner seat portion 37. The disk valve 55 allows the inner flow paths 45 to constantly communicate with the upper chamber 18 through the cut portion 68.

The disk valve 55 abuts against the projecting portion 36, the inner seat portion 37 and the outer seat portion 38 of the piston valve member 31 to close the outer flow paths 46. The disk valve 55 is unseated from the outer seat portion 38 to open the outer flow paths 46 by the pressure in the lower chamber 19 increased higher than the pressure in the upper chamber 18 by the piston 17 moving together with the rod 22 when the rod 22 moves toward a compression side where the amount of entry of the rod 22 into the cylinder 11 increases. Consequently, when the rod 22 moves toward the compression side, the fluid flows from the lower chamber 19 toward the upper chamber 18 through the outer flow paths 46 provided in the piston valve member 31. Accordingly, the disk valve 55 operates as a compression disk valve that selectively opens and closes the flow paths 46. Thus, the flow paths 46 allow the fluid to flow therethrough when the rod 22 and the piston 17 move toward the compression side.

The spring member 57 abuts against and presses the disk valve 55 in the axial direction toward the lower chamber 19, thereby causing the disk valve 55 to abut against the piston valve member 31. The restricting member 58 has an outer diameter substantially equal to that of the disk valve 55. The restricting member 58 has a plurality of circumferentially spaced communicating holes 69 axially extending therethrough. The communicating holes 69 allow the inner flow paths 45 to constantly communicate with the upper chamber 18 through the cut portion 68. When the disk valve 55 is deformed away from the outer seat portion 38 by a predetermined amount, the restricting member 58 abuts against the disk valve 55 to restrict further deformation of the disk valve 55.

The outer tube 13 comprises a cylindrical member 72 and a bottom cover member 73 fitted to the lower end of the cylindrical member 72 to close the opening at the lower end of the cylindrical member 72. The bottom cover member 73 is fitted at the outer periphery thereof to the inner periphery of the cylindrical member 72. In the fitted state, the bottom cover member 73 assumes a stepped configuration projecting axially more outward as the distance from the outer periphery increases toward the center of the bottom cover member 73. The bottom cover member 73 is sealingly secured to the cylindrical member 72 by welding, for example.

The inner tube 12 has a base valve 71 provided at the lower end thereof. The base valve 71 defines the lower chamber 19 and the reservoir chamber 14 in the cylinder 11. The base valve 71 has a damping valve 103 which generates compression damping force and a suction valve 110 that allows the hydraulic liquid to flow from the reservoir chamber 14 into the lower chamber 19 without substantially generating damping force during the extension stroke of the rod 22.

The base valve 71 has an annular base valve member (valve member) 76 fitted into the inner tube 12 of the cylinder 11 to divide the interior of the cylinder 11 into two chambers, i.e. a lower chamber 19 and a reservoir chamber 14. The base valve member 76 is made of a sintered metal. The base valve member 76 has a step portion 77 formed at the outer periphery of the upper part thereof. The step portion 77 is smaller in diameter than the lower part of the base valve member 76. The step portion 77 is fitted to the inner periphery at the lower end of the inner tube 12. Further, the base valve member 76 has an annular projecting foot 78 axially projecting from the outer periphery of the lower end thereof. The base valve member 76 abuts against the bottom cover member 73 at the projecting foot 78. The projecting foot 78 has a plurality of circumferentially spaced flow path grooves 79 radially extending therethrough. The flow path grooves 79 allow communication between the space between the inner tube 12 and the outer tube 13 and the space between the base valve 71 and the bottom cover member 73 to form the reservoir chamber 14.

Figure 2:
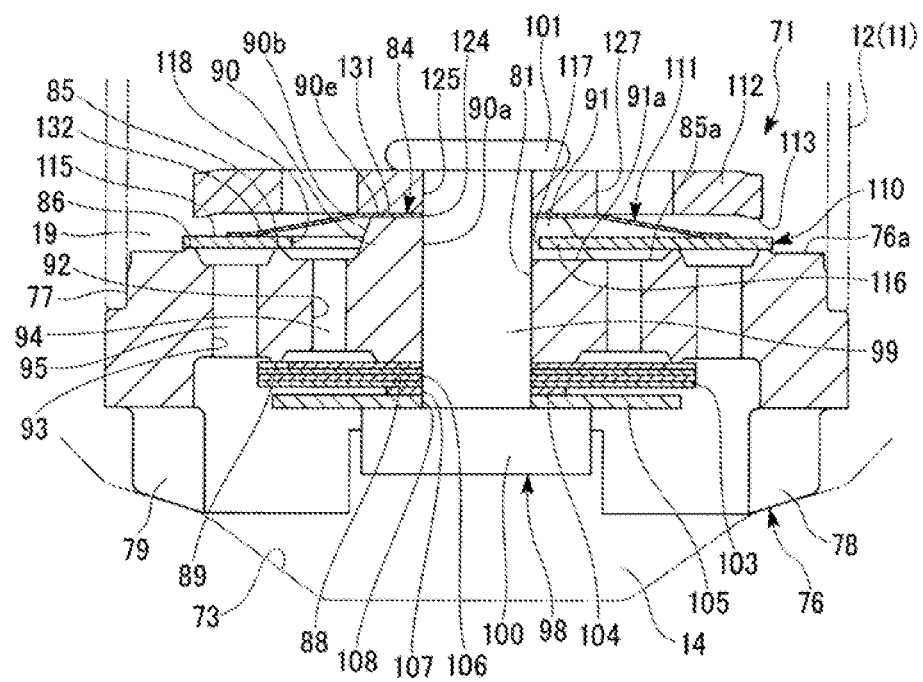
FIG. 2 is a sectional view showing a base valve of the shock absorber as the first embodiment of the cylinder apparatus according to the present invention.

As shown in FIG. 2, the base valve member 76 has a through-bore 81 axially extending through the diametrical center thereof. Further, the base valve member 76 has a projecting portion 84 formed on a surface (one end surface) 76a at an end thereof axially opposite to the end thereof where the projecting foot 78 is provided. The projecting portion 84 is located radially around the through-bore 81 and projects axially in the shape of a tapered cylinder. The base valve member 76 further has an axially projecting annular inner seat portion 85 located radially outer than the projecting portion 84, and an axially projecting annular outer seat portion 86 located radially outer than the inner seat portion 85. Further, the base valve member 76 has an axially projecting annular boss portion 68 formed on the axial end thereof where the projecting foot 78 is provided. The boss portion 88 is located radially outside the through-bore 81. The base valve member 76 further has an axially projecting annular seat portion 89 located radially outer than the boss portion 88 and radially inner than the projecting foot 78.

The inner seat portion 85 and the outer seat portion 86 coincide in height with each other in the axial direction of the base valve member 76. The projecting portion 84 is higher in projecting height than the inner seat portion 85 and the outer seat portion 86. The seat portion 89 is somewhat higher in projecting height than the boss portion 88.

Figure 3:
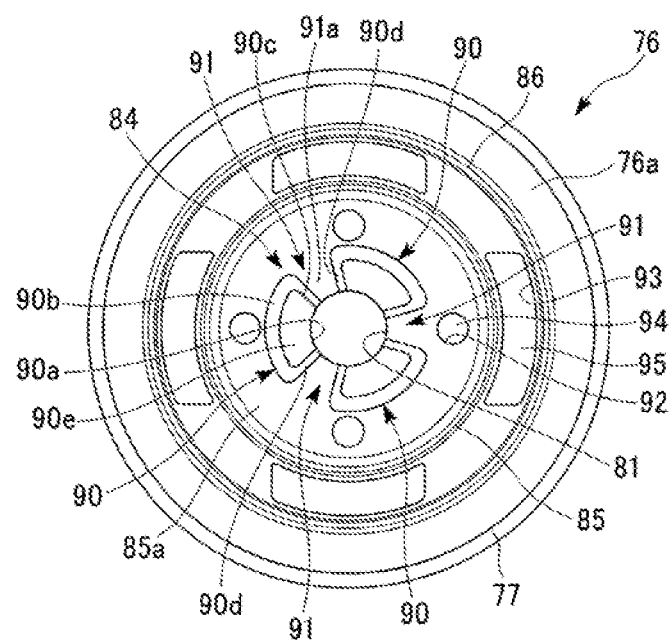
FIG. 3 is a plan view showing a base valve member of the shock absorber as the first embodiment of the cylinder apparatus according to the present invention.

In this embodiment, the projecting portion 84 comprises, as shown in FIG. 3, a plurality (specifically, three) of projections 90 divided from each other in the circumferential direction of the projecting portion 84. The projections 90 have the same shape and are arranged at equal spaces in the circumferential direction. Each projection 90 has a part of an inner surface 90a at a side closer to the through-bore 81. The part of the inner surface 90a has a shape obtained by cutting off a part of a cylindrical surface concentric with and equal in diameter to the through-bore 81. Each projection 90 has an outer surface 90b at a side remote from the through-bore 81. The outer surface 90b is concentric with and larger in diameter than the through-bore 81. The outer surface 90b has a shape obtained by cutting off a part of a tapered surface. Further, each projection 90 has a pair of side surfaces 90c and 90d on both sides thereof in the circumferential direction of the projecting portion 84. The side surfaces 90c and 90d are inclined at the same angle so as to come closer to each other as the distance from the projecting proximal end increases toward the projecting distal end of the projection 90, as viewed in FIG. 3. Each projection 90 has a top 90e at the projecting distal end thereof. The top 90e is substantially similar in shape to but smaller in size than the projecting proximal end. The top 90e extends in a direction perpendicular to the axis of the base valve member 76.

As has been stated above, the projecting portion 84 comprises a plurality of projections 90 of the same shape spaced from each other in the circumferential direction of the base valve member 76. Consequently, the projecting portion 84 is provided with the same number of grooves 91 as the number of projections 90, each groove 91 being located between a pair of circumferentially adjacent projections 90. Each groove 91 is locally defined by the mutually opposing side surfaces 90c and 90d of a pair of adjacent projections 90 and a bottom surface 91a between the side surfaces 90c and 90d. The bottom surface 91a is flush with an annular flat surface 85a between the projecting portion 84 and the inner seat portion 85 and is parallel to the top 90e.

The grooves 91 gradually narrow in width with the distance toward the through-bore 81 at the same height position. At the same radial position, the grooves 91 gradually narrow in width with the distance toward the bottom surface 91a. As a result, the bottom surface 91a gradually narrows in width with the distance toward the through-bore 81. The spacing between the mutually opposing side surfaces 90c and 90d also gradually decreases with the distance toward the through-bore 81 at the same height position. It should be noted that the base valve member 76 is made of a sintered metal, as has been stated above, and that the radially outer peripheral surface of the projecting portion 84, which comprises a plurality of outer surfaces 90b, is tapered because of sinter forming.

As shown in FIG. 2, the base valve member 76 has a plurality of circumferentially spaced flow path holes 92. Each flow path hole 92 has one axial end opening between the projecting portion 84 and the inner seat portion 85. The other axial end of the flow path hole 92 opens between the boss portion 88 and the seat portion 89. Further, the base valve member 76 has a plurality of circumferentially spaced flow path holes 93. Each flow path hole 93 has one axial end opening between the inner seat portion 85 and the outer seat portion 86. The other axial end of the flow path hole 93 opens at a position remoter from the boss portion 88 than the seat portion 89.

Each inner flow path hole 92 defines one flow path 94 that allows the hydraulic liquid to flow between the lower chamber 19 and the reservoir chamber 14. Each outer flow path hole 93 defines the other flow path 95 that allows the hydraulic liquid to flow between the lower chamber 19 and the reservoir chamber 14. Thus, the flow paths 94 and 95 are provided in the base valve member 76.

The base valve 71 has a pin member 98. The pin member 98 has a circular columnar or cylindrical shaft portion 99 inserted through the through-bore 81 of the base valve member 76. The pin member 98 further has a disk-shaped head portion 100 provided at one end of the shaft portion 99 and having a larger diameter than the shaft portion 99. A staked (caulked, crimped, or riveted) portion (enlarged-diameter part) 101 is formed at the other end of the shaft portion 99 opposite to the end thereof where the head portion 100 is provided. The staked portion 101 is increased to be larger in diameter than the shaft portion 99 by staking (caulking, crimping or riveting).

The base valve 71 has a disk valve 103 operating as a damping valve, a spacer 104, and a restricting member 105 at the axial end of the base valve member 76 where the projecting foot 78 is provided. The disk valve 103, the spacer 104, and the restricting member 105 are stacked in the mentioned order from the base valve member 76. Further, the base valve 71 has a disk valve 110 operating as a suction valve, a spring member 111, and a restricting member 112 at the axial end of the base valve member 76 opposite to the axial end where the projecting foot 78 is provided. The disk valve 110, the spring member 111, and the restricting member 112 are stacked in the mentioned order from the base valve member 76.

The disk valve 103 has a pin insertion bore 106 axially extending through the diametrical center thereof. The spacer 104 has a pin insertion bore 107 axially extending through the diametrical center thereof. The restricting member 105 has a pin insertion bore 108 axially extending through the diametrical center thereof. The disk valve 103, the spacer 104, and the restricting member 105 have the shaft portion 99 of the pin member 98 inserted through their respective pin insertion bores 106, 107 and 108. In this state, the disk valve 103, the spacer 104, and the restricting member 105 are clamped at their inner peripheral portions by the head portion 100 of the pin member 98 and the base valve member 76.

Figure 4:
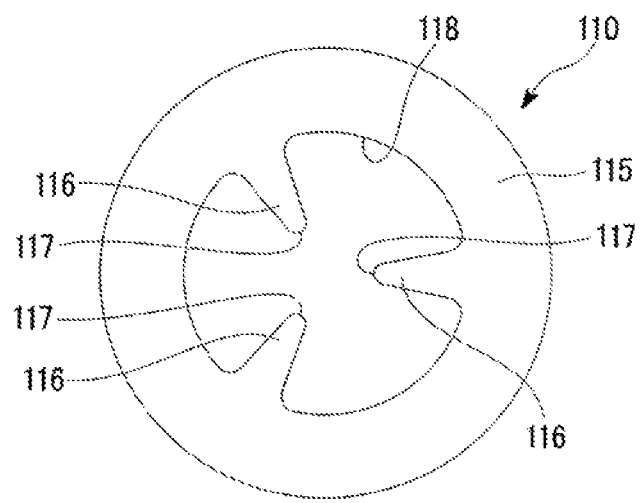
FIG. 4 is a plan view showing a disk valve of the shock absorber as the first embodiment of the cylinder apparatus according to the present invention.

The disk valve 110 is formed by press forming from a single plate member. The disk valve 110 is flat and annular as shown in FIG. 4. That is, the disk valve 110 comprises an annular valve body portion 115 having constant inner and outer diameters, i.e. a constant width in the radial direction, and a plurality (specifically, three, the same number as the number of grooves 91) of tongue portions (small-diameter portions) 116 that extend radially inward from the inner periphery of the valve body portion 115 to form small-diameter portions of the disk valve 110. The tongue portions 116 have the same shape and extend from respective circumferentially equally spaced positions of the valve body portion 115 toward the center of the valve body portion 115. Each tongue portion 116 is tapered in the radial direction. The distal end 117 of each tongue portion 116 has a semicircular shape and projects toward the center of the valve body portion 115. The tip of the distal end 117 is disposed at the smallest diameter position of the disk valve 110. The diameter of the disk valve 110 at the tips of the distal ends 117 of the tongue portions 116 is somewhat larger than the diameter of the shaft portion 99 of the pin member 98.

As shown in FIG. 2, the disk valve 110 has the shaft portion 99 of the pin member 98 inserted therethrough at a position closer to the center thereof than the distal ends 117 of all the tongue portions 116. With the tongue portions 116 disposed in the grooves 91, respectively, the disk valve 110 is provided on the one end surface 76a of the base valve member 76, on which the projecting portion 84, the inner seat portion 85, and the outer seat portion 896 are formed. The disk valve 110 is movable at both the inner and outer peripheries thereof selectively away from and into contact with the surface 76a. When the disk valve 110 moves in this way, the tongue portions 116 extend and move within the grooves 91, and the distal ends 117 at the inner peripheral ends of the tongue portions 116 slide relative to the shaft portion 99 of the pin member 98. The inner peripheral edge (large-diameter portion) 118 of the valve body portion 115 is larger in diameter than a part of the disk valve 110 corresponding to the tongue portions 116 and faces the outer periphery of the projecting portion 84. The disk valve 110 closes the flow paths 95 provided between the inner seat portion 85 and the outer seat portion 86 with the valve body portion 115 when abutting against the inner and outer seat portions 85 and 86 simultaneously. When the valve body portion 115 unseats from the inner seat portion 85 and the outer seat portion 86, the disk valve 110 opens the flow paths 95.

The spring member 111 has a pin insertion bore 124 axially extending through the diametrical center thereof. The restricting member 112 has a pin insertion bore 125 axially extending through the diametrical center thereof. The spring member 111 and the restricting member 112 have the shaft portion 99 of the pin member 98 inserted through their respective pin insertion bores 124 and 125. In this state, the spring member 111 and the restricting member 112 are clamped at their inner peripheral portions by the projecting portion 84 of the base valve member 76 and the enlarged-diameter part 101 of the pin member 98. The enlarged-diameter part 101 is provided forward of the disk valve 110 in a direction in which the disk valve 110 is movable away from the surface 76a of the base valve member 76. The enlarged-diameter part 101 prevents fall-off of the disk valve 110 from the pin member 98 through the spring member 111 and the restricting member 112.

In assembly of the base valve 71, the shaft portion 99 (before being staked) of the pin member 98 is inserted through the following parts in the following order: the pin insertion bore 108 of the restricting member 105; the pin insertion bore 107 of the spacer 104; the pin insertion bore 106 of the disk valve 103; the through-bore 81 of the base valve member 76; the space inside the plurality of tongue portions 116 of the disk valve 110; the pin insertion bore 124 of the spring member 111; and the pin insertion bore 125 of the restricting member 112. In this state, the end of the shaft portion 99 opposite to the end thereof provided with the head portion 100, which projects from the restricting member 112, is staked toward the head portion 100. Consequently, the restricting member 105, the spacer 104, the disk valve 103, the base valve member 76, the spring member 111, and the restricting member 112 are restricted from movement by the head portion 100. Accordingly, the shaft portion 99 is enlarged in diameter so as to clamp the above-mentioned members without any gap in the axial direction. In this way, the enlarged-diameter part 101 is formed. At this time, the base valve member 76 receives the staking load introduced through the restricting member 112 and the spring member 111. In other words, the pin member 98 is staked at the distal end thereof to form the enlarged-diameter part 101, with the staking load being supported by the projecting portion 84 of the base valve member 76.

The disk valve 103, which is provided at the end of the base valve member 76 closer to the reservoir chamber 14, comprises a plurality of axially stacked single-plate bored disks having the same outer diameter. The disk valve 103 has a somewhat larger outer diameter than the seat portion 89. The disk valve 103 can close the inner flow paths 94 by abutting against both the boss portion 88 and the seat portion 89 of the base valve member 76. The disk valve 103 unseats from the seat portion 89, shown in FIG. 2, to open the inner flow paths 94 when the rod 22, shown in FIG. 1, moves toward the compression side, and consequently the piston 17 moves toward the lower chamber 19, causing an increase in pressure in the lower chamber 19. Thus, the inner flow paths 94 provided in the base valve member 76 allow the fluid to flow from the lower chamber 19 toward the reservoir chamber 14 when the rod 22 moves toward the compression side. Accordingly, the disk valve 103 operates as a compression disk valve that selectively opens and closes the flow paths 94 to generate damping force. Thus, the flow paths 94 allow the fluid to flow therethrough when the rod 22 and the piston 17 move toward the compression side. It should be noted that the disk valve 103 mainly performs the function of allowing the hydraulic liquid to flow from the lower chamber 19 into the reservoir chamber 14 so as to discharge a surplus of hydraulic liquid resulting from the entry of the rod 22 into the cylinder 11, in association with the compression disk valve 55 provided on the piston 17, shown in FIG. 1. It should be noted that the compression disk valve may be used as a relief valve that relieves the pressure in the cylinder when the pressure increases excessively.

As shown in FIG. 2, the spacer 104 has an outer diameter smaller than that of the disk valve 103 and somewhat smaller than that of the boss portion 88. The restricting member 105 has an outer diameter somewhat smaller than that of the disk valve 103 and substantially equal to that of the seat portion 89. When the disk valve 103 is deformed away from the seat portion 89 by a predetermined amount, the restricting member 105 abuts against the disk valve 103 to restrict further deformation of the disk valve 103.

The disk valve 110, which is provided at the end of the base valve member 76 closer to the lower chamber 19, has an outer diameter somewhat larger than that of the outer seat portion 86. The disk valve 110 allows the inner flow paths 94 to constantly communicate with the lower chamber 19 through the gaps between the tongue portions 116 located radially inner than a position at which the disk valve 110 abuts against the inner seat portion 85. As has been stated above, the disk valve 110 is movable at both the inner and outer peripheries thereof selectively away from and into contact with the base valve member 76 (in the axial direction), and when the disk valve 110 moves in this way, the distal ends 117 of the tongue portions 116 are guided by the shaft portion 99 of the pin member 98.

The disk valve 110 closes the outer flow paths 95 with the valve body portion 115 abutting against both the inner and outer seat portions 85 and 86 of the base valve member 76. When the rod 22, shown in FIG. 1, moves toward the extension side, and consequently the piston 17 moves toward the upper chamber 18, causing a reduction in pressure in the lower chamber 19, the disk valve 110 moves along the projecting portion 84 and unseats from both the outer and inner seat portions 86 and 85 to open the flow paths 95. Consequently, the outer flow paths 95 provided in the base valve member 76 allow the fluid to flow from the reservoir chamber 14 toward the lower chamber 19 when the rod 22 moves toward the extension side. Accordingly, the disk valve 110 operates as an extension disk valve that selectively opens and closes the flow paths 95. It should be noted that the disk valve 110 mainly performs the function of allowing the hydraulic liquid to flow from the reservoir chamber 14 into the lower chamber 19 with substantially no resistance (with such a low resistance that no damping force will be generated) so as to compensate for a deficiency of hydraulic liquid as a result of the rod 22 projecting from the cylinder 11, in association with the extension disk valve 50 provided on the piston 17. Thus, the flow paths 95 allow the fluid to flow therethrough when the rod 22 and the piston 17 move toward the extension side.

The spring member 111 abuts against and presses the disk valve 110 in the axial direction, thereby causing the disk valve 110 to abut against the base valve member 76. The restricting member 112 has an abutting portion 113 at the outer periphery thereof that axially projects toward the disk valve 110. The abutting portion 113 has a diameter somewhat smaller than the outer diameter of the disk valve 110 and substantially equal to the diameter of the outer seat portion 86. Accordingly, when the disk valve 110 moves in the direction for opening the flow paths 95, the abutting portion 113 can abut against the disk valve 110 to stop the movement of the disk valve 110 without clamping the spring member 111 between the restricting member 112 and the disk valve 110. The restricting member 112 has a plurality of circumferentially spaced communicating holes 127. The communicating holes 127 axially extend through the restricting member 112 to allow the inner flow paths 94 to constantly communicate with the lower chamber 19 through the gaps between the tongue portions 116. When the disk valve 110 lifts by a predetermined amount away from the inner and outer seat portions 85 and 86, i.e. away from the surface 76a, of the base valve member 76, the restricting member 112 abuts against the valve body portion 115 of the disk valve 110 at the abutting portion 113 to restrict further lifting of the disk valve 110. The outer diameter of the restricting member 112 is larger than the diameter of the inner peripheral edge 118 of the valve body portion 115 of the disk valve 110.

The spring member 111 is a substantially plate-shaped spring and has a flat disk-shaped base 131 having a circular pin insertion bore 124 in the center thereof, and a plurality of elastic legs 132 extending from the outer periphery of the base 131 radially outward and obliquely in one axial direction of the base 131.

The elastic legs 132 of the spring member 111 have a spring constant set to minimum, so that, even when deformed, the elastic legs 132 generate only a minimum necessary urging force to make the disk valve 110 abut against both the inner seat portion 85 and the outer seat portion 86. Therefore, the disk valve 110 can keep the flow paths 95 closed reliably by the urging force of the elastic legs 132, provided that the pressure in the lower chamber 19 is not less than the pressure in the reservoir chamber 14. However, when the pressure in the lower chamber 19 becomes less than the pressure in the reservoir chamber 14, the disk valve 110 unseats from the inner seat portion 85 and the outer seat portion 86 to open the flow paths 95 immediately while pressing the easily deformable elastic legs 132. Thus, the disk valve 110 per se is a check valve that generates substantially no damping force. That is, the disk valve 110 operates as a check valve that opens, at least, at a piston speed of not more than 0.05 m/s.

The above-described shock absorber of the first embodiment operates as follows. When the rod 22 moves together with the piston 17 toward the extension side relative to the cylinder 11, the amount of hydraulic fluid or liquid in the upper chamber 18 and in the lower chamber 19 becomes short by an amount corresponding to the amount by which the rod 22 projects from the cylinder 11. Consequently, the pressure in the lower chamber 19 becomes lower than the pressure in the reservoir chamber 14. At this time, because the disk valve 110 is pressed only by the elastic legs 132 of the spring member 111, which have a small spring constant, the disk valve 110 immediately unseats from both the outer seat portion 86 and the inner seat portion 85 to open the flow paths 95 to supply hydraulic liquid from the reservoir chamber 14 into the lower chamber 19.

Thereafter, when the rod stroke changes from the extension stroke to the compression stroke, the amount of hydraulic liquid in the cylinder 11 becomes surplus as a result of the entry of the rod 22 into the cylinder 11. When the pressure in the lower chamber 19 becomes higher than the pressure in the reservoir chamber 14, the disk valve 110 is quickly abutted against both the outer seat portion 86 and the inner seat portion 85 by the urging force of the elastic legs 132 to close the flow paths 95.

In the shock absorber disclosed in the above-mentioned Japanese Patent Application Publication No. Sho 64-40731, sliding movement of a disk valve is guided by a projecting portion formed around a through-bore of a valve member through which a pin member is inserted. Incidentally, the valve member is formed by sintering with a view to reducing manufacturing cost, and so forth. In the forming process by sintering, if both upper and lower molds are split molds, hydraulic cylinders, for example, used to pressurize the molds also need to be driven for each split mold. In this regard, for a member having a very uneven shape, a split mold unavoidably needs to be used in order to make the density uniform. However, a member having less unevenness in shape can be formed by using a mold and a driving device, both of which are simple in structure. Therefore, it is desirable to use an integral mold for such a member of a little uneven shape.

As shown clearly in FIG. 2, the valve member 76 in the embodiment of the present invention has the projecting foot 78 raised in height to increase the flow path area of each flow path groove 79 between a pair of circumferentially spaced mutually adjacent portions of the projecting foot 78. The purpose of this is because the demand for improving the damping force characteristics has increased recently, and there is a demand for ensuring large flow paths in the valve member. In this embodiment, the projecting portion-side part of the valve member, which has less unevenness in shape, is formed by using an integral mold. When an integral, mold is used for forming, it is necessary to provide a draft angle. If a draft angle is introduced, the outer peripheral surface of the resulting projecting portion becomes a tapered surface. If the projecting portion has a tapered outer peripheral surface, there will be a difference in radial gap between the inner periphery of the disk valve and the outer periphery of the projecting portion according to the axial position of the projecting portion, which makes it likely that the track and attitude of the disk valve will become unstable, making it impossible to obtain stable valve characteristics. It is a matter of course that the above-described problem may be solved by additionally performing cutting to remove the taper to form a cylindrical surface, or by providing, over the outer periphery of the projecting portion, another component part having a cylindrical outer periphery. In either case, however, there will be an increase in cost.

In this regard, according to the shock absorber of the first embodiment, the grooves 91 are provided in the projecting portion 84 of the base valve member 76, and the distal ends 117 of the tongue portions 116 of the disk valve 110 are guided to slide by the pin member 98 through the grooves 91. Therefore, the track and attitude of the disk valve 110 are stabilized, and stable valve characteristics can be obtained. Moreover, because the grooves 91 can be formed in the projecting portion 84 by sintering, it is unnecessary to perform cutting process additionally or to provide an additional component part. Accordingly, the increase in cost can be suppressed. In addition, because the height of the projecting foot 78 can be increased, it is possible to ensure a large flow path area for each flow path groove 79 between a pair of circumferentially spaced mutually adjacent portions of the projecting foot 78. Consequently, damping force characteristics improve, and it is possible to improve the running stability and ride quality of a vehicle equipped with the shock absorber.

In addition, when the pin member 98 is staked to form the enlarged-diameter part 101, the staking load can be supported by the projecting portion 84 of the base valve member 76. Therefore, it is unnecessary to provide another component over the base valve member 76 in order to support the staking load, and hence possible to suppress the increase in cost.

In addition, the annular restricting member 112, which restricts movement of the disk valve 110 away from the base valve member 76, can be clamped by the enlarged-diameter part 101 and the projecting portion 84. Therefore, it is unnecessary to provide an additional component for clamping the restricting member 112, and hence possible to suppress the increase in cost.

In addition, the projecting portion 84 has an outer periphery projecting long to face the inner peripheral edge 118 of the valve body portion 115 of the disk valve 110. The projecting portion 84 is likely to be tapered when it is formed by sintering, in particular. Therefore, the above-described advantageous effects are exhibited even more favorably.

Second Embodiment:

Next, a second embodiment of the present invention will be explained with reference to FIG. 5, mainly with regard to the points in which the second embodiment differs from the first embodiment. It should be noted that members or portions common to the first and second embodiments are denoted by the same names and reference numerals.

Figure 5:
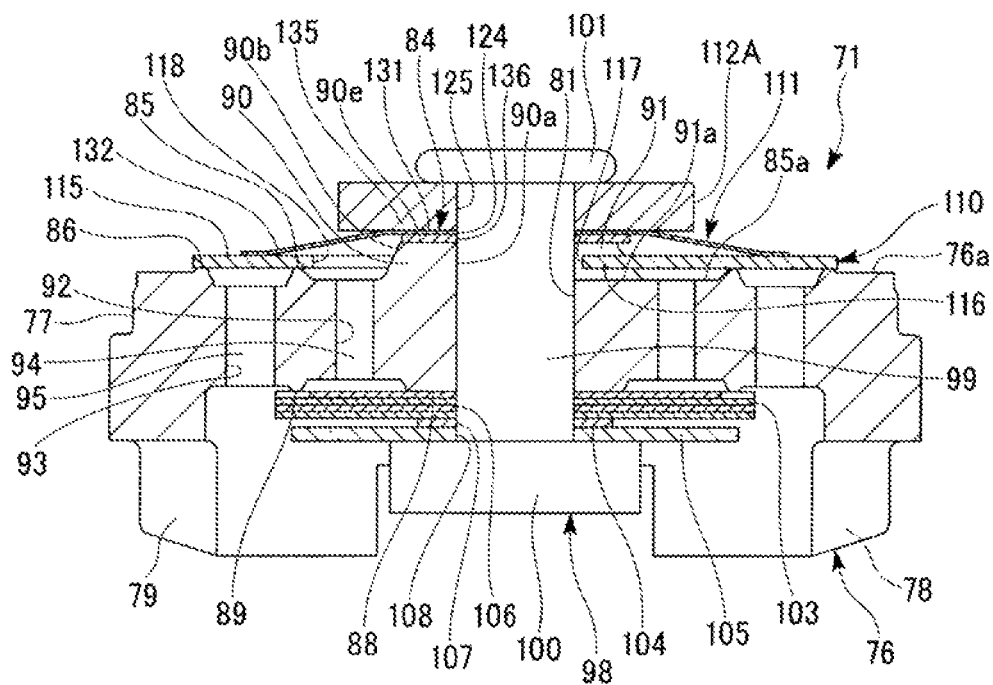
FIG. 5 is a sectional view showing a base valve of a shock absorber as a second embodiment of the cylinder apparatus according to the present invention.

The second embodiment uses, as shown in FIG. 5, a restricting member 112A formed by slightly modifying the restricting member 112 of the first embodiment, and an additional restricting member 135. The restricting member 112A is an annular member having no axially projecting portion (abutting portion 113 in the first embodiment) and no through-holes (communicating holes 127 in the first embodiment) axially extending therethrough, except a pin insertion bore 125. The restricting member 112A has an outer diameter larger than the outer diameter of the base 131 of the spring member 111 but smaller than the diameter of the inner peripheral edge 118 of the valve body portion 115 of the disk valve 110.

The restricting member 135 is an annular member having a pin insertion bore 136 axially extending through the diametrical center thereof. The restricting member 135 is a general-purpose washer. The restricting member 135 has an outer diameter larger than the diameter of the disk valve 110 at the position of the distal ends 117 of the tongue portions 116 but smaller than the diameter of the inner peripheral edge 118 of the valve body portion 115. Further, the outer diameter of the restricting member 135 is not larger than the outer diameter of the base 131 of the spring member 111. The restricting member 135 is disposed between the spring member 111 and the base valve member 76 and clamped at its inner peripheral portion by the projecting portion 84 of the base valve member 76 and the base 131 of the spring member 111.

When the disk valve 110 moves by a predetermined amount away from the surface 76a, i.e. away from the inner and outer seat portions 85 and 86, of the base valve member 76, the restricting member 135 abuts against the distal ends 117 of the tongue portions 116 of the disk valve 110 to restrict further deformation of the disk valve 110.

According to the second embodiment arranged as stated above, the thick-walled restricting member 112A can be reduced in size. Therefore, it is possible to achieve weight and cost reductions. In addition, because a general-purpose, thin-walled washer can be used as the restricting member 135, it is possible to suppress cost increase despite the addition of the restricting member 135.

Third Embodiment:

Next, a third embodiment of the present invention will be explained with reference to FIG. 6, mainly with regard to the points in which the third embodiment differs from the first embodiment. It should be noted that members or portions common to the first and third embodiments are denoted by the same names and reference numerals.

Figure 6:
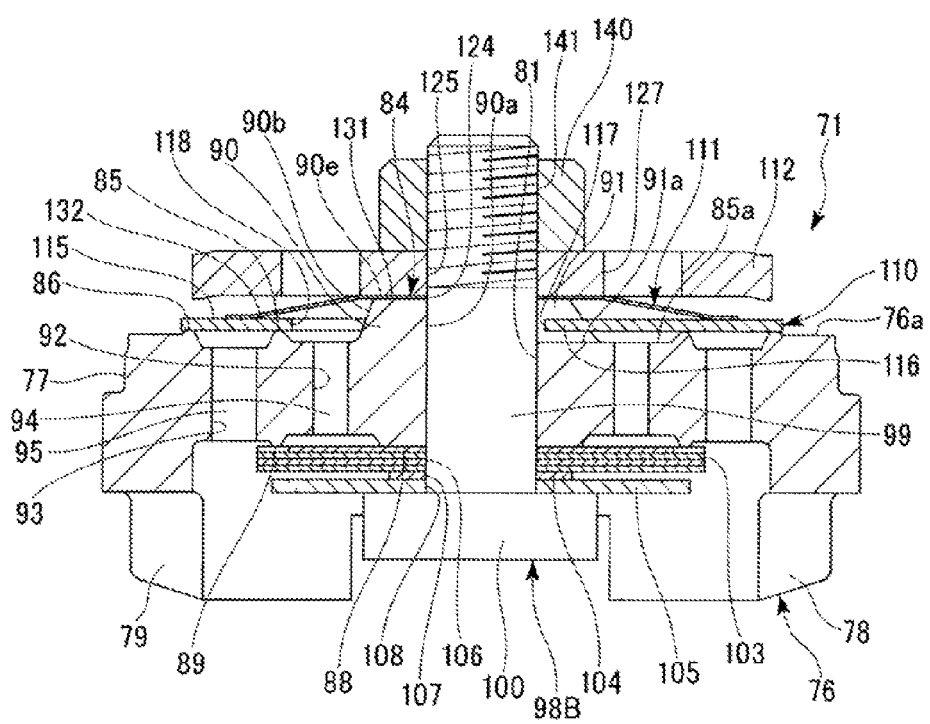
FIG. 6 is a sectional view showing a base valve of a shock absorber as a third embodiment of the cylinder apparatus according to the present invention.

The third embodiment uses, as shown in FIG. 6, a pin member 98B formed by slightly modifying the pin member 98 of the first embodiment, and a nut (enlarged-diameter part) 140. The pin member 98B has an external thread 141 formed on the end of the shaft portion 99 opposite to the end thereof provided with the head portion 100. The nut 140 is thread-engaged with the external thread 141 to clamp the restricting member 105, the spacer 104, the disk valve 103, the base valve member 76, the spring member 111 and the restricting member 112 by the nut 140 and the head portion 100, without performing staking. Thus, the nut 140 prevents fall-off of the disk valve 110 from the pin member 98B.

According to the third embodiment arranged as stated above, the nut 140 and the head portion 100 are used to clamp the restricting member 105, the spacer 104, the disk valve 103, the base valve member 76, the spring member 111 and the restricting member 112. Therefore, clamping force can be accurately controlled with relative ease.

It should be noted that the second embodiment, shown in FIG. 5, may use a pin member 98A having an external thread 141 formed on a shaft portion 99 and a nut 140 similar to those of the third embodiment, shown in FIG. 6, in place of the pin member 98 having the enlarged-diameter part 101 formed by staking.

In the foregoing first to third embodiments, the number of projections 90 and that of grooves 91 of the projecting portion 84 of the base valve member 76 and the number of tongue portions 116 of the disk valve 110 are not each limited to 3, as stated above, but may be not more than 2 or not less than 4. However, the numbers of projections 90, grooves 91 and tongue portions 116 are each preferably 3 in view of achieving both stable open and close movement of the disk valve 110 and favorable forming of the projections 90 and the grooves 91 by sintering.

In addition, it is preferable from the viewpoint of the operation of the disk valve 110 that the positions of all the flow paths 94 in the circumferential direction of the disk valve 110 be arranged not to align with the tongue portions 116 (i.e. the grooves 91). In other words, the flow paths 94 align with the tongue portions 116 in the radial direction of the disk valve 110. Therefore, if the flow paths 94 align with the tongue portions 116 also in the circumferential direction of the disk valve 110, the flow paths 94 spout the fluid toward the tongue portions 116, which may exert influence on the operation of the disk valve 110. For this reason, it is preferable to arrange the flow paths 94 so that the positions of all the flow path holes 92 do not align with the tongue portions 116 in the circumferential direction of the disk valve 110.

It is also possible to apply the above-described structure to the piston valve member 31 and the disk valve 55 of the piston 17. That is, the spacer 56 is omitted, but instead the amount of projection of the projecting portion 36 around the through-bore 35 of the piston valve member 31 is increased, and the structure of the projecting portion 84 is applied to the projecting portion 36. More specifically, the projecting portion 36 is locally provided with circumferentially spaced grooves. In addition, the structure of the disk valve 110 is applied to the disk valve 55. That is, tongue portions are formed at the inner peripheral side of the disk valve 55 so that small-diameter portions at the distal ends of the tongue portions slide relative to the mounting shaft portion 26 of the rod 22. It is also possible to apply the above-described structure to a valve externally installed to the cylinder 11.

In the foregoing embodiments, the present invention is applied to a cylinder apparatus including a cylinder having a fluid sealed therein, a rod having one end extending out of the cylinder, flow paths through which the fluid flows when the rod moves, an annular valve member provided with at least a part of the flow paths and having a through-bore, a pin member inserted through the through-bore of the valve member, an annular disk valve having the pin member inserted therethrough and movable at both inner and outer peripheries thereof selectively away from and into contact with one end surface of the valve member to open and close the flow paths, respectively, and an enlarged-diameter part provided on the pin member at a position forward of the disk valve in a direction in which the disk valve is movable away from the one end surface of the valve member to prevent fall-off of the disk valve. According to the present invention, the valve member has a projecting portion around the through-bore on the one end surface thereof. The projecting portion is locally provided with circumferentially spaced grooves. The disk valve has small-diameter portions extending toward the grooves from the inner periphery thereof. The small-diameter portions are slidable relative to the pin member. Thus, the projecting portion of the valve member is provided with grooves, and the small-diameter portions of the disk valve is guided to slide by the pin member through the grooves. Therefore, the track of the disk valve becomes stable, and stable valve characteristics can be obtained.

The pin member is staked at the distal end thereof to form the enlarged-diameter part, with the staking load being supported by the projecting portion of the valve member. Accordingly, when the pin member is staked to form the enlarged-diameter part, the staking load can be supported by the projecting portion of the valve member. Therefore, it is unnecessary to provide another component over the valve member in order to support the staking load, and hence possible to suppress the increase in cost.

In addition, because the enlarged-diameter part is a nut that is thread-engaged with the pin member, it is possible to facilitate accurate control of the installation condition of the constituent elements.

In addition, an annular restricting member that restricts movement of the disk valve away from the one end surface of the valve member is clamped between the enlarged-diameter part and the projecting portion. Because the annular restricting member, which restricts movement of the disk valve away from the one end surface of the valve member, can be clamped by the enlarged-diameter part and the projecting portion, it is unnecessary to provide another component for clamping the restricting member, and hence possible to suppress the increase in cost.

In addition, the disk valve is provided with a large-diameter portion that faces the outer periphery of the projecting portion. Accordingly, the outer periphery of the projecting portion is lengthened so as to face the large-diameter portion. Therefore, stable valve characteristics can be obtained even more effectively.

In addition, because the outer diameter of the restricting member is larger than the diameter of a part of the disk valve corresponding to the small-diameter portions but smaller than the diameter of the large-diameter portion of the disk valve, the restricting member can be reduced in size. Therefore, it is possible to suppress the increase in cost and weight.

According to the present invention, it is possible to obtain optimum valve characteristics.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2012-019174 filed on Jan. 31, 2012.

The entire disclosure of Japanese Patent Application No. 2012-019174 filed on Jan. 31, 2012 including specification, claims, drawings and summary is incorporated herein by reference in its entirety.

What is claimed is:

1. A cylinder apparatus comprising:
a cylinder having a fluid sealed therein;
a rod having one end extending out of the cylinder;
flow paths through which the fluid flows when the rod moves;
an annular valve member provided with at least a part of the flow paths and having a through-bore;
a pin member inserted through the through-bore of the valve member;
an annular disk valve through which the pin member is inserted, the disk valve being movable at both inner and outer peripheries thereof selectively away from and into contact with one end surface of the valve member to open and close the flow paths, respectively; and
an enlarged-diameter part provided on a portion of the pin member in a direction in which the disk valve is movable away from the one end surface of the valve member to prevent fall-off of the disk valve;
the valve member having a projecting portion around the through-bore on the one end surface, the projecting portion projecting axially;
the projecting portion being locally provided with circumferentially spaced grooves, each of the grooves extending through the projecting portion to the through-bore in a radial direction of the through-bore;
the disk valve having small-diameter portions extending through the grooves from an inner periphery thereof, each of the small-diameter portions having a distal end,
wherein, when the disk valve is moved at both inner and outer peripheries thereof selectively away from and into contact with one end surface of the valve member, the small-diameter portions are moved in the grooves and the distal ends are slidable relative to the pin member.

2. The cylinder apparatus of claim 1, wherein the enlarged-diameter part has a staked portion with an enlarged diameter formed by staking a distal end of the pin member, with a staking load being supported by the projecting portion of the valve member.

3. The cylinder apparatus of claim 1, wherein the enlarged-diameter part is a nut that is thread-engaged with the pin member.

4. The cylinder apparatus of claim 1, further comprising:
an annular restricting member adapted to restrict movement of the disk valve away from the one end surface of the valve member, the restricting member being clamped between the enlarged-diameter part and the projecting portion.

5. The cylinder apparatus of claim 2, further comprising:
an annular restricting member adapted to restrict movement of the disk valve away from the one end surface of the valve member, the restricting member being clamped between the enlarged-diameter part and the projecting portion.

6. The cylinder apparatus of claim 3, further comprising:
an annular restricting member adapted to restrict movement of the disk valve away from the one end surface of the valve member, the restricting member being clamped between the enlarged-diameter part and the projecting portion.

7. The cylinder apparatus of claim 4, wherein the disk valve comprises an annular valve body portion, and
the valve body portion is provided with an inner peripheral edge that faces an outer surface of the projecting portion.

8. The cylinder apparatus of claim 7, further comprising:
an annular restricting member adapted to restrict movement of the disk valve away from the one end surface of the valve member, the restricting member being clamped between the enlarged-diameter part and the projecting portion,
wherein the restricting member has an outer diameter larger than a diameter of a part of the disk valve corresponding to the small-diameter portions but smaller than a diameter of the inner peripheral portion.

9. The cylinder apparatus of claim 1, wherein the valve member is made of a sintered metal, and an outer surface of the projecting portion is tapered.

10. The cylinder apparatus of claim 9, wherein:
the projecting portion includes a top at the projecting distal end thereof;
each of the grooves includes a bottom surface opposite to the top; and
the grooves gradually narrow in width with the distance toward the bottom surface at the same radial positions.

11. The cylinder apparatus of claim 1, wherein the grooves gradually narrow in width with the distance toward the through-bore at the same height position.

12. The cylinder apparatus of claim 10, wherein the grooves gradually narrow in width with the distance toward the through-bore at the same height position.

13. The cylinder apparatus of claim 10, wherein the bottom surface is parallel to the top.

14. The cylinder apparatus of claim 1, wherein the disk valve comprises an annular valve body portion, and each of the small-diameter portions of the disk valve comprises a tongue portion that extends radially inward from the inner periphery of the valve body portion, each of the tongue portions being tapered in the radial direction.

15. The cylinder apparatus of claim 14, wherein the distal end of each of the tongue portions has a semicircular shape.

* * * * *